US010169246B2

(12) United States Patent
Senior et al.

(10) Patent No.: US 10,169,246 B2
(45) Date of Patent: Jan. 1, 2019

(54) REDUCING METADATA SIZE IN COMPRESSED MEMORY SYSTEMS OF PROCESSOR-BASED SYSTEMS

(71) Applicant: QUALCOMM Incorporated, San Diego, CA (US)

(72) Inventors: Richard Senior, San Diego, CA (US); Christopher Edward Koob, Round Rock, TX (US); Gurvinder Singh Chhabra, San Diego, CA (US); Andres Alejandro Oportus Valenzuela, San Jose, CA (US); Nieyan Geng, San Diego, CA (US); Raghuveer Raghavendra, San Diego, CA (US); Christopher Porter, Athens, GA (US); Anand Janakiraman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/592,611

(22) Filed: May 11, 2017

(65) Prior Publication Data

US 2018/0329830 A1    Nov. 15, 2018

(51) Int. Cl.
*G06F 3/06* (2006.01)
*G06F 12/02* (2006.01)
*G06F 12/1036* (2016.01)

(52) U.S. Cl.
CPC ........ *G06F 12/1036* (2013.01); *G06F 3/0608* (2013.01); *G06F 3/0661* (2013.01);
(Continued)

(58) Field of Classification Search
CPC ............... G06F 3/0608; G06F 12/0246; G06F 2212/1044; G06F 3/0689
See application file for complete search history.

(56) References Cited

U.S. PATENT DOCUMENTS 6,131,143 A * 10/2000 Sakai .................. G06F 12/0864
    711/128
6,516,386 B1 * 2/2003 Pang .................. G06F 12/1054
    711/118
(Continued)

FOREIGN PATENT DOCUMENTS

WO    2011048606 A2    4/2011
WO    2015179591 A1    11/2015

OTHER PUBLICATIONS

Luis Ceze, Lecture 16 Notes, Feb. 18, 2009, University of Washington, CSE 378 Winter 2009 Class, Slides 1-20, https://courses.cs.washington.edu/courses/cse378/09wi/lectures/lec16.pdf.*
(Continued)

*Primary Examiner* — Reginald G Bragdon
*Assistant Examiner* — Curtis James Kortman
(74) *Attorney, Agent, or Firm* — Withrow & Terranova, PLLC

(57) ABSTRACT

Reducing metadata size in compressed memory systems of processor-based systems is disclosed. In one aspect, a compressed memory system provides $2^N$ compressed data regions, corresponding $2^N$ sets of free memory lists, and a metadata circuit. The metadata circuit associates virtual addresses with abbreviated physical addresses, which omit N upper bits of corresponding full physical addresses, of memory blocks of the $2^N$ compressed data regions. A compression circuit of the compressed memory system receives a memory access request including a virtual address, and selects one of the $2^N$ compressed data regions and one of the $2^N$ sets of free memory lists based on a modulus of the virtual address and $2^N$. The compression circuit retrieves an abbreviated physical address corresponding to the virtual address from the metadata circuit, and performs a memory access operation on a memory block associated with the (Continued)

abbreviated physical address in the selected compressed data region.

21 Claims, 7 Drawing Sheets

(52) U.S. Cl.
CPC ........ G06F 3/0685 (2013.01); G06F 12/0246 (2013.01); *G06F 2212/1044* (2013.01); *G06F 2212/60* (2013.01)

(56) References Cited

U.S. PATENT DOCUMENTS

| | | | |
|---|---|---|---|
| 8,402,205 B2 | 3/2013 | Goss et al. | |
| 8,793,290 B1 | 7/2014 | Pruthi et al. | |
| 8,990,670 B2 | 3/2015 | Ozdemir et al. | |
| 9,214,965 B2 | 12/2015 | Fitzpatrick et al. | |
| 9,542,118 B1 | 1/2017 | Lercari et al. | |
| 2002/0144078 A1* | 10/2002 | Topham | G06F 12/1054 711/203 |
| 2003/0061446 A1* | 3/2003 | Lee | G06F 12/0864 711/128 |
| 2003/0225981 A1* | 12/2003 | Castelli | G06F 12/0284 711/147 |
| 2007/0283125 A1* | 12/2007 | Manczak | G06F 11/3466 711/207 |
| 2011/0231610 A1* | 9/2011 | Yano | G06F 12/0246 711/118 |
| 2012/0117305 A1* | 5/2012 | Arya | G06F 12/06 711/103 |
| 2013/0054928 A1 | 2/2013 | Im | |
| 2015/0242309 A1 | 8/2015 | Talagala et al. | |
| 2015/0339228 A1* | 11/2015 | Heddes | G06F 12/0802 711/3 |

OTHER PUBLICATIONS

John L. Hennesy et. al, Computer Architecture: A Quantitative Approach, Sep. 30, 2011, Morgan Kaufmann, 5th Edition, pp. 72-131 (1-44 of the provided copy).*

Palomar Technologies, System on a Chip (SoC), Jun. 27, 2015, Palomar Technologies, pp. 1-2, https://web.archive.org/web/20150627140005/http://www.palomartechnologies.com/applications/system-on-a-chip.*

International Search Report and Written Opinion for PCT/US2018/030184, dated Jul. 23, 2018, 15 pages.

* cited by examiner

REDUCING METADATA SIZE IN COMPRESSED MEMORY SYSTEMS OF PROCESSOR-BASED SYSTEMS

BACKGROUND

I. Field of the Disclosure

The technology of the disclosure relates generally to computer memory systems, and more particularly to compressed memory systems configured to compress and decompress data stored in and read from compressed system memory.

II. Background

As applications executed by conventional processor-based systems increase in size and complexity, memory bandwidth may become a constraint on system performance. While available memory bandwidth may be increased through the use of wider memory communications channels, this approach may incur penalties in terms of increased cost and/or additional area required for the memory on an integrated circuit (IC). Thus, one approach to increasing memory bandwidth in a processor-based system without increasing the width of memory communication channels is through the use of data compression. A data compression system can be employed in a processor-based system to store data in a compressed format, thus increasing effective memory capacity without increasing physical memory capacity.

In this regard, some conventional data compression systems provide a compression engine to compress data to be written to a main system memory. After performing compression, the compression engine writes the compressed data to the system memory, along with metadata that maps a virtual address of the compressed data to a physical address in the system memory where the compressed data is actually stored. The data compression system may also maintain lists of free memory blocks (i.e., free memory lists) in the system memory to track areas of memory in which compressed data can be stored. Each free memory list holds pointers to available memory blocks within a compressed data region of the system memory. The contents of the free memory lists may be cached in a free memory list cache of the compression engine.

However, because the metadata used for address mapping is stored in the system memory, a large metadata store may negatively impact system performance. Thus, it is desirable to minimize the amount of system memory required to store the metadata used for address mapping, while still providing effective data compression.

SUMMARY OF THE DISCLOSURE

Aspects of the present disclosure involve reducing metadata size in compressed memory systems of processor-based systems. In this regard, in exemplary aspects disclosed herein, a compressed memory system is provided to enable data compression while reducing the size of stored metadata. The compressed memory system includes a metadata circuit that is configured to store abbreviated physical addresses that have a size that is reduced by N bits relative to full physical addresses of memory blocks within the compressed memory system. The compressed memory system further provides $2^N$ compressed data regions and $2^N$ sets of free memory lists in a system memory. Thus, for instance, if an 18-bit full physical address is reduced by 4 bits to a 14-bit abbreviated physical address, the compressed memory system provides 16 (i.e., 24) compressed data regions and 16 sets of free memory lists. When performing a memory operation in response to a memory access request (i.e., a memory write request or a memory read request), a compression circuit of the compressed memory system selects a compressed data region and a set of free memory lists using the modulus of a virtual address of the memory access request and the value $2^N$. The compression circuit then performs the requested memory operation using the selected compressed data region and the selected set of free memory lists. By reducing the amount of data required to store physical addresses of memory blocks within the compressed memory system, the amount of available system memory is increased, resulting in improved system performance.

In another aspect, a compressed memory system of a processor-based system is provided. The compression circuit is configured to receive a memory access request comprising a virtual address. The compression circuit is further configured to select a compressed data region of a plurality of $2^N$ compressed data regions, each comprising a plurality of memory blocks of a system memory, and a set of free memory lists of a plurality of $2^N$ sets of free memory lists, each corresponding to a plurality of free memory blocks of the plurality of memory blocks, based on a modulus of the virtual address and $2^N$. The compression circuit is also configured to retrieve an abbreviated physical address corresponding to the virtual address from a metadata circuit configured to associate a plurality of virtual addresses to a plurality of abbreviated physical addresses of the plurality of memory blocks, each abbreviated physical address omitting N upper bits of a corresponding full physical address. The compression circuit is additionally configured to perform a memory access operation on a memory block of the plurality of memory blocks associated with the abbreviated physical address in the selected compressed data region.

In another aspect, a compressed memory system for reducing metadata size in compressed memory systems of processor-based systems is provided. The compressed memory system includes a means for receiving a memory access request comprising a virtual address. The compressed memory system further includes a means for selecting a compressed data region of a plurality of $2^N$ compressed data regions, each comprising a plurality of memory blocks, and a set of free memory lists of a plurality of $2^N$ sets of free memory lists, each corresponding to a plurality of free memory blocks of the plurality of memory blocks, based on a modulus of the virtual address and $2^N$. The compressed memory system also includes a means for retrieving an abbreviated physical address corresponding to the virtual address from a metadata circuit, the abbreviated physical address omitting N upper bits of a corresponding full physical address. The compressed memory system additionally includes a means for performing a memory access operation on a memory block associated with the abbreviated physical address in the selected compressed data region.

In another aspect, a method for reducing metadata size in compressed memory systems of processor-based systems is provided. The method includes receiving a memory access request comprising a virtual address. The method further includes selecting a compressed data region of a plurality of $2^N$ compressed data regions, each comprising a plurality of memory blocks, and a set of free memory lists of a plurality of $2^N$ sets of free memory lists, each corresponding to a plurality of free memory blocks of the plurality of memory blocks, based on a modulus of the virtual address and $2^N$. The method also includes retrieving an abbreviated physical address corresponding to the virtual address from a metadata circuit, the abbreviated physical address omitting N upper bits of a corresponding full physical address. The method additionally includes performing a memory access operation on a memory block associated with the abbreviated physical address in the selected compressed data region.

In another aspect, a non-transitory computer-readable medium is provided, having stored thereon computer-executable instructions. When executed by a processor, the computer-executable instructions cause the processor to receive a memory access request comprising a virtual address. The computer-executable instructions further cause the processor to select a compressed data region of a plurality of $2^N$ compressed data regions, each comprising a plurality of memory blocks, and a set of free memory lists of a plurality of $2^N$ sets of free memory lists, each corresponding to a plurality of free memory blocks of the plurality of memory blocks, based on a modulus of the virtual address and $2^N$. The computer-executable instructions also cause the processor to retrieve an abbreviated physical address corresponding to the virtual address from a metadata circuit, the abbreviated physical address omitting N upper bits of a corresponding full physical address. The computer-executable instructions additionally cause the processor to perform a memory access operation on a memory block associated with the abbreviated physical address in the selected compressed data region.

DETAILED DESCRIPTION

Figure 1:
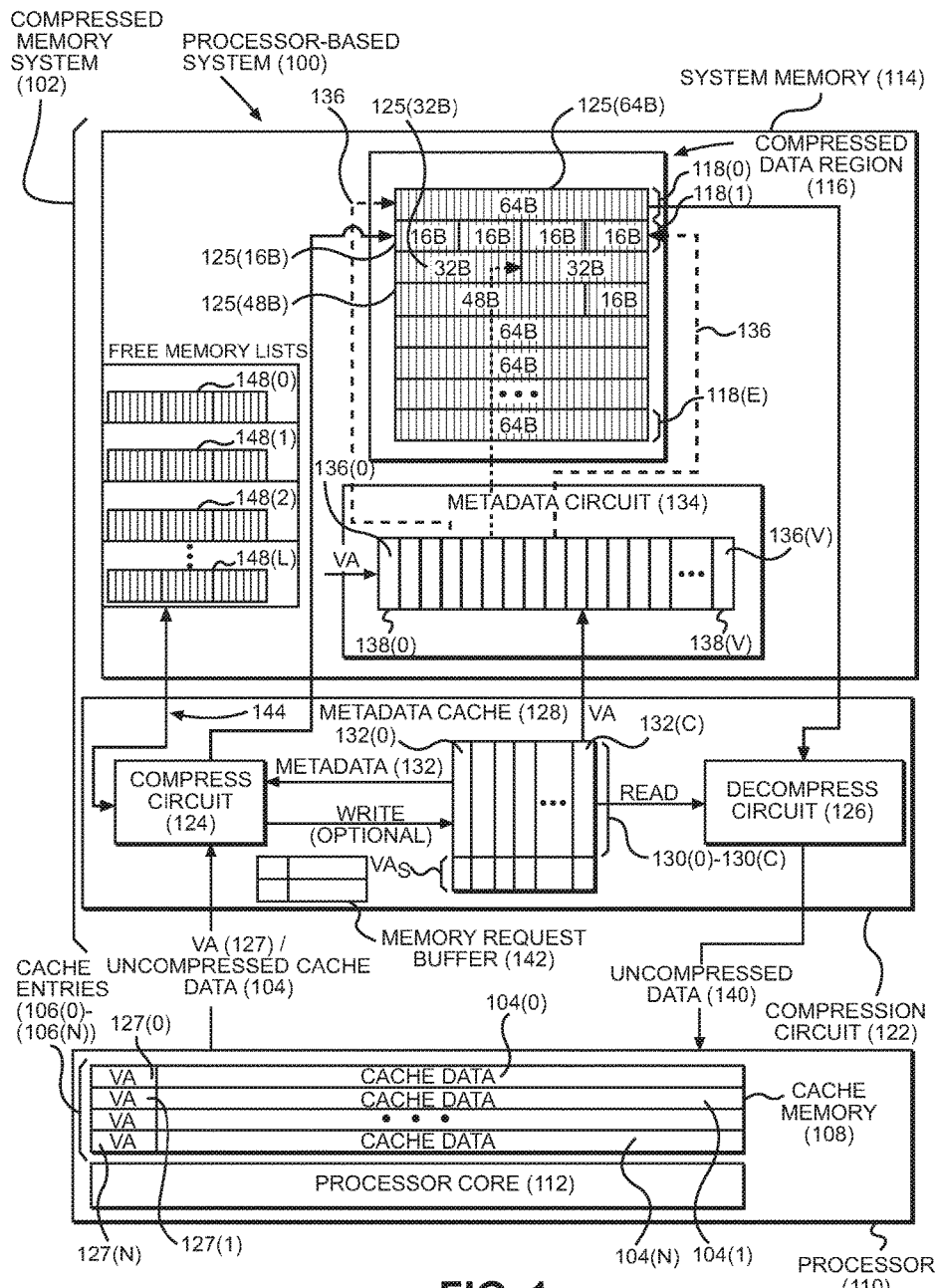
FIG. 1 is a schematic diagram of an exemplary processor-based system that includes a compressed memory system configured to compress cache data from an evicted cache entry in a cache memory and read metadata used to access a physical address in the compressed system memory to write the compressed cache data.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects of the present disclosure involve reducing metadata size in compressed memory systems of processor-based systems. In some aspects, a processor-based system provides a compressed memory system configured to enable data compression while reducing the size of stored metadata. The compressed memory system provides $2^N$ compressed data regions and $2^N$ sets of free memory lists in a system memory. A metadata circuit of the compressed memory system is configured to store abbreviated physical addresses that have a size that is reduced by N bits relative to full physical addresses of memory blocks within the compressed memory system. To perform a memory operation in response to a memory access request, a compression circuit of the compressed memory system selects a compressed data region and a set of free memory lists using the modulus of a virtual address of the memory access request and the value $2^N$. The compression circuit then performs the requested memory operation using the selected compressed data region and the selected set of free memory lists.

Before discussing examples of processor-based systems that reduce metadata size in compressed memory systems, a processor-based system that is configured to provide data compression is first described. In this regard, FIG. 1 is a schematic diagram of an exemplary processor-based system 100 that includes a compressed memory system 102. The processor-based system 100 is configured to store cache data 104(0)-104(N) in uncompressed form in cache entries 106(0)-106(N) in a cache memory 108. The cache entries 106(0)-106(N) may be cache lines. For example, as shown in FIG. 1, the cache memory 108 may be a level 2 (L2) cache memory included in a processor 110. The cache memory 108 may be private to a processor core 112 in the processor 110 or shared between multiple processor cores, including the processor core 112 in the processor 110. The compressed memory system 102 includes a system memory 114 that includes a compressed data region 116 configured to store data in memory entries 118(0)-118(E) (which may be memory lines) in compressed form, which is shown in FIG. 1. For example, the system memory 114 may include a double data rate (DDR) static random access memory (SRAM). The processor 110 is configured to access the system memory 114 during read and write operations to execute software instructions and perform other processor operations.

Providing the ability to store compressed data in the compressed data region 116 increases memory capacity of the processor-based system 100 over physical memory size of the system memory 114. In some aspects, the processor 110 uses virtual addressing, wherein a virtual-to-physical address translation is performed to effectively address the compressed data region 116 without being aware of the compression system and compression size of the compressed data region 116. In this regard, a compression circuit 122 is provided in the compressed memory system 102 to compress uncompressed data from the processor 110 to be written into the compressed data region 116, and to decompress compressed data received from the compressed data region 116 to provide such data in uncompressed form to the processor 110. The compression circuit 122 includes a compress circuit 124 configured to compress data from the processor 110 to be written into the compressed data region 116. For example, as shown in FIG. 1, the compress circuit 124 may be configured to compress 64-byte (64B) data words down to 48-byte (48B) compressed data words, 32-byte (32B) compressed data words, or 16-byte (16B) compressed data words, which can be stored in respective memory blocks 125(64B), 125(48B), 125(32B), and 125(16B), each having a smaller size than each of the entire memory entries 118(0)-118(E). If uncompressed data from the processor 110 cannot be compressed down to the next smaller-sized memory block 125 configured for the compressed memory system 102, such uncompressed data is stored uncompressed over the entire width of one of the memory entries 118(0)-118(E). For example, the width of the one of the memory entries 118(0)-118(E) may be 64B, and thus can store 64B memory blocks, such as the memory block 125(64B). The compression circuit 122 also includes a decompress circuit 126 configured to decompress compressed data from the compressed data region 116 to be provided to the processor 110.

However, to provide for faster memory access without the need to compress and decompress, the cache memory 108 is provided. The cache entries 106(0)-106(N) in the cache memory 108 are configured to store the cache data 104(1)-104(N) in uncompressed form. Each of the cache entries 106(0)-106(N) may be the same width as each of the memory entries 118(0)-118(E) for performing efficient memory read and write operations. The cache entries 106(0)-106(N) are accessed by respective virtual address ("VA") tags 127(0)-127(N), because as discussed above, the compressed memory system 102 provides more addressable memory space to the processor 110 than physical address space provided in the compressed data region 116. When the processor 110 issues a memory read request for a memory read operation, a virtual address of the memory read request is used to search the cache memory 108 to determine if the virtual address matches one of the virtual address tags 127(0)-127(N) of the cache entries 106(0)-106(N). If so, a cache hit occurs, and the cache data 104(0)-104(N) in the hit cache entry of the cache entries 106(0)-106(N) is returned to the processor 110 without the need to decompress the cache data 104(0)-104(N). However, because the number of the cache entries 106(0)-106(N) is less than the number of the memory entries 118(0)-118(E), a cache miss can occur where the cache data 104(0)-104(N) for the memory read request is not contained in the cache memory 108.

Thus, with continuing reference to FIG. 1, in response to a cache miss, the cache memory 108 is configured to provide the virtual address of the memory read request to the compression circuit 122 to retrieve data from the compressed data region 116. In this regard, the compression circuit 122 may first consult a metadata cache 128 that contains metadata cache entries 130(0)-130(C) each containing metadata 132(0)-132(C) indexed by a virtual address. The metadata cache 128 is faster to access than the compressed data region 116. The metadata 132(0)-132(C) is data, such as a pointer, used to access a physical address (PA) in the compressed data region 116 to access the memory entries 118(0)-118(E) containing the compressed data for the virtual address. If the metadata cache 128 contains the metadata 132(0)-132(C) for the memory read request, the compression circuit 122 uses the metadata 132(0)-132(C) to access the correct memory entry of the memory entries 118(0)-118(E) in the compressed data region 116 to provide the corresponding compressed data region 116 to the decompress circuit 126. If the metadata cache 128 does not contain the metadata 132(0)-132(C) for the memory read request, the compression circuit 122 provides the virtual address for the memory read request to a metadata circuit 134 that contains metadata 136(0)-136(V) in corresponding metadata entries 138(0)-138(V) for all virtual address space in the processor-based system 100. Thus, the metadata circuit 134 can be linearly addressed by the virtual address of the memory read request. The metadata 136(0)-136(V) is used to access the correct memory entry of the memory entries 118(0)-118(E) in the compressed data region 116 for the memory read request to provide the corresponding compressed data region 116 to the decompress circuit 126.

With continuing reference to FIG. 1, the decompress circuit 126 receives the compressed data region 116 in response to the memory read request. The decompress circuit 126 decompresses the compressed data region 116 into uncompressed data 140, which can then be provided to the processor 110. The uncompressed data 140 is also stored in the cache memory 108. However, if the cache memory 108 does not have an available cache entry of the cache entries 106(0)-106(N), the cache memory 108 may evict one of the existing cache entries 106(0)-106(N) to the compressed data region 116 to make room for storing the uncompressed data 140.

To do so, the cache memory 108 first sends the virtual address and uncompressed cache data 104 of the evicted cache entry to the compress circuit 124. The compress circuit 124 receives the virtual address and the uncompressed cache data 104 for the evicted cache entry. The compress circuit 124 initiates a metadata read operation to the metadata cache 128 to obtain metadata 132 associated with the virtual address. During, before, or after the metadata read operation, the compress circuit 124 compresses the uncompressed cache data 104 into compressed data to be stored in the compressed data region 116. If the metadata read operation to the metadata cache 128 results in a cache miss, the metadata cache 128 issues a metadata read operation to the metadata circuit 134 in the system memory 114 to obtain metadata 136 associated with the virtual address. The metadata cache 128 is then stalled. Because accesses to the compressed data region 116 can take much longer than the processor 110 can issue memory access operations, uncompressed data 140 received from the processor 110 for subsequent memory write requests may be buffered in a memory request buffer 142.

After the metadata 136 comes back from the compressed data region 116 to update the metadata cache 128, the metadata cache 128 provides the metadata 136 as the metadata 132 to the compress circuit 124. The compress circuit 124 determines whether the new compression size of the compressed data region 116 fits into the same memory block size in the compressed data region 116 as used to previously store data for the virtual address of the evicted cache entry. For example, the processor 110 may have updated the cache data 104(0)-104(N) in the evicted cache entry since being last stored in the compressed data region 116. If a new memory block 125 is needed to store the compressed data region 116 for the evicted cache entry, the compress circuit 124 recycles a pointer 144 to the current memory block 125 in the compressed memory system 102 associated with the virtual address of the evicted cache entry to one of free memory lists 148(0)-148(L) of pointers 144 to available memory blocks 125 in the compressed data region 116. The compress circuit 124 then obtains the pointer 144 from one of the free memory lists 148(0)-148(L) to the new, available memory block 125 of desired memory block size in the compressed data region 116 to store the compressed data region 116 for the evicted cache entry. The compress circuit 124 then stores the compressed data region 116 for the evicted cache entry in the memory block 125 in the compressed data region 116 associated with the virtual address for the evicted cache entry determined from the metadata 132.

If a new memory block 125 was assigned to the virtual address for the evicted cache entry, the metadata 132(0)-132(C) in the metadata cache entry of the metadata cache entries 130(0)-130(C) corresponding to the virtual address tag of the virtual address tags 127(0)-127(N) of the evicted cache entry is updated based on the pointer 144 to the new memory block 125. The metadata cache 128 then updates the metadata 136(0)-136(V) in the metadata entry of the metadata entries 138(0)-138(V) corresponding to the virtual address in the metadata cache 128 based on the pointer 144 to the new memory block 125.

Figure 2:
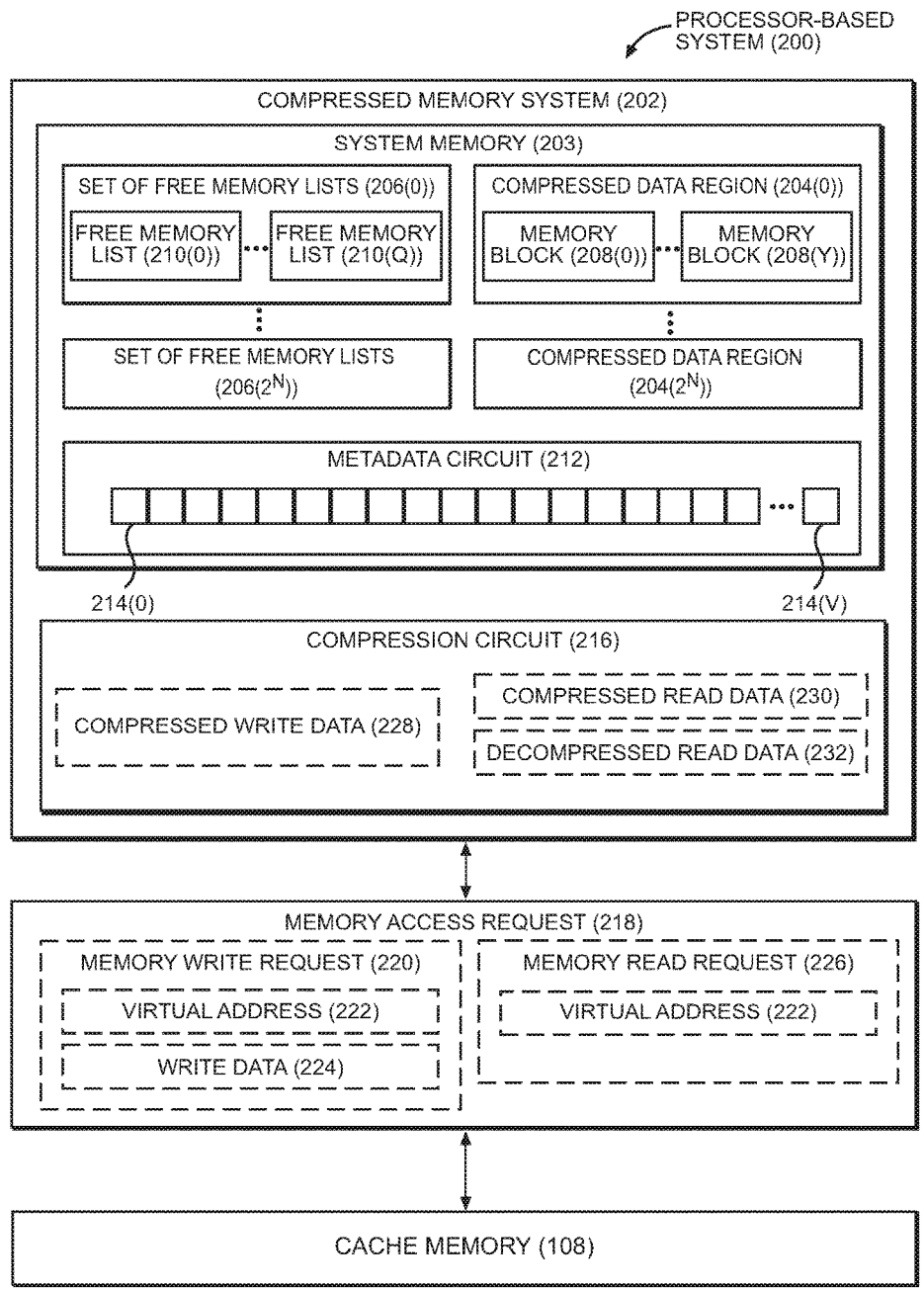
FIG. 2 is a block diagram of an exemplary processor-based system featuring a compressed memory system configured to reduce metadata size using a plurality of $2^N$ compressed data regions and a plurality of $2^N$ sets of free memory lists.

Because the metadata 136(0)-136(V) of the metadata circuit 134 is stored in the system memory 114, the metadata circuit 134 may consume an excessive amount of the system memory 114, thus negatively impacting system performance. Accordingly, it is desirable to minimize the amount of the system memory 114 that is required to store the metadata 136(0)-136(V), while still providing effective data compression. In this regard, FIG. 2 illustrates a processor-based system 200 that provides a compressed memory system 202 for reducing metadata size. It is to be understood that, unless otherwise indicated in FIG. 2, the processor-based system 200 includes constituent elements and functionality corresponding to the processor-based system 100 of FIG. 1.

The compressed memory system 202 provides a system memory 203 containing a plurality of compressed data regions 204(0)-204($2^N$) and a corresponding plurality of sets of free memory lists 206(0)-206($2^N$). Compressed data region 204(0) includes a plurality of memory blocks 208(0)-208(Y), which correspond in functionality to the memory blocks 125 of FIG. 1. Similarly, a set of free memory lists 206(0) provides free memory lists 210(0)-210(Q), corresponding in functionality to the free memory lists 148(0)-148(L) of FIG. 1. Although not shown in FIG. 2, it is to be understood that each of the plurality of compressed data regions 204(0)-204($2^N$) includes memory blocks equivalent in functionality to the plurality of memory blocks 208(0)-208(Y), and each of the plurality of sets of free memory lists 206(0)-206($2^N$) includes free memory lists equivalent in functionality to the free memory lists 210(0)-210(Q).

The compressed memory system 202 further provides a metadata circuit 212 that operates in a similar manner to the metadata circuit 134 of FIG. 1, with the exception that the metadata circuit 212 of FIG. 2 stores abbreviated physical addresses 214(0)-214(V). Each of the abbreviated physical addresses 214(0)-214(V) represents a portion of a physical address of a memory block (such as one of the plurality of memory blocks 208(0)-208(Y)) of one of the plurality of compressed data regions 204(0)-204($2^N$). In particular, the abbreviated physical addresses 214(0)-214(V) each omit a top N number of bits of the corresponding physical address. For example, if N=4 and the physical addresses of the plurality of memory blocks 208(0)-208(Y) are each 18 bits in size, the abbreviated physical addresses 214(0)-214(V) will each store the lower 14 bits of a corresponding physical address. An exemplary illustration of the abbreviated physical addresses 214(0)-214(V) is discussed in greater detail below with respect to FIG. 3.

In exemplary operation, a compression circuit 216 of the compressed memory system 202 may receive a memory access request 218. In some aspects, the memory access request 218 originates from the cache memory 108. For example, the memory access request 218 may include a memory write request 220 that specifies a virtual address 222 and write data 224, and that is sent by the cache memory 108 as part of a cache eviction operation. Alternatively, the memory access request 218 may include a memory read request 226 providing the virtual address 222 sent by the cache memory 108 as part of a cache fill operation.

The compression circuit 216 is configured to select one of the plurality of compressed data regions 204(0)-204($2^N$) and a corresponding one of the plurality of sets of free memory lists 206(0)-206($2^N$) to use in carrying out the memory access request 218. To do so, the compression circuit 216 performs a modulus operation using the virtual address 222 and the value $2^N$. The result of the modulus operation is used as an index to select the one of the plurality of compressed data regions 204(0)-204($2^N$) and the corresponding one of the plurality of sets of free memory lists 206(0)-206($2^N$).

The compression circuit 216 then uses the virtual address 222 to retrieve an appropriate one of the abbreviated physical addresses 214(0)-214(V), such as abbreviated physical address 214(0), from the metadata circuit 212, and performs the requested memory access operation using the selected one of the plurality of compressed data regions 204(0)-204($2^N$) and, if necessary, the selected one of the plurality of sets of free memory lists 206(0)-206($2^N$). For instance, for the memory write request 220, the compression circuit 216 may perform the memory access operation by compressing the write data 224 into compressed write data 228 and using the selected one of the plurality of sets of free memory lists 206(0)-206($2^N$) to allocate a free memory block (such as memory block 208(0)) in the selected one of the plurality of compressed data regions 204(0)-204($2^N$). The compression circuit 216 may then write the compressed write data 228 to the free memory block 208(0). To update the metadata circuit 212, the compression circuit 216 may derive one of the abbreviated physical addresses 214(0)-214(V), such as the abbreviated physical address 214(0), from a full physical address of the free memory block 208(0), and may store the abbreviated physical address 214(0) in association with the virtual address 222. For the memory read request 226, the compression circuit 216 may perform the memory access operation by retrieving the abbreviated physical address 214(0) corresponding to the virtual address 222, and reading compressed read data 230 from a memory block (such as the memory block 208(0)) of the selected one of the plurality of compressed data regions 204(0)-204($2^N$) indicated by the abbreviated physical address 214(0). The compression circuit 216 may then decompress the compressed read data 230 into decompressed read data 232 and return the decompressed read data 232 to the cache memory 108.

Figure 3:
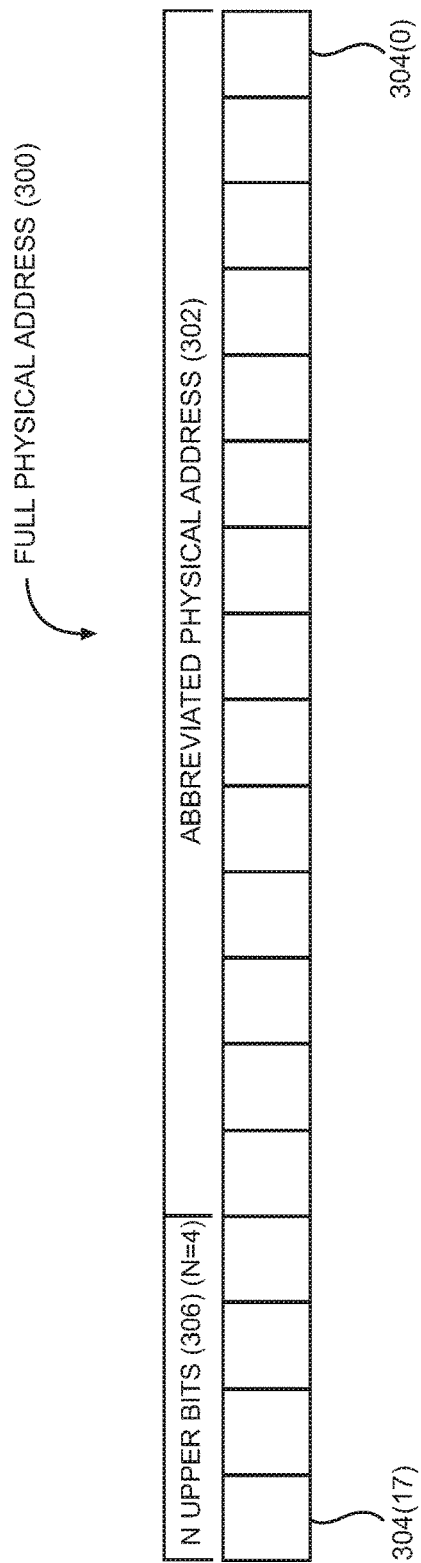
FIG. 3 is a block diagram illustrating how an abbreviated physical address is derived from a full physical address according to some aspects of the compressed memory system of FIG. 2.

To illustrate the relationship between an exemplary full physical address 300 and a derived abbreviated physical address 302, FIG. 3 is provided. In the example of FIG. 3, N has a value of four (4), and the full physical address 300 includes a total of 18 bits 304(0)-304(17) and represents a memory address with which one of the plurality of memory blocks 208(0)-208(Y) of the plurality of compressed data regions 204(0)-204($2^N$) may be accessed. As seen in FIG. 3, the abbreviated physical address 302 is generated by omitting N upper bits 306 (in this example, the four upper bits) of the full physical address 300. As described above, the abbreviated physical address 302 is stored by the metadata circuit 212 of FIG. 2, resulting in an overall reduction in metadata size.

Figure 4:
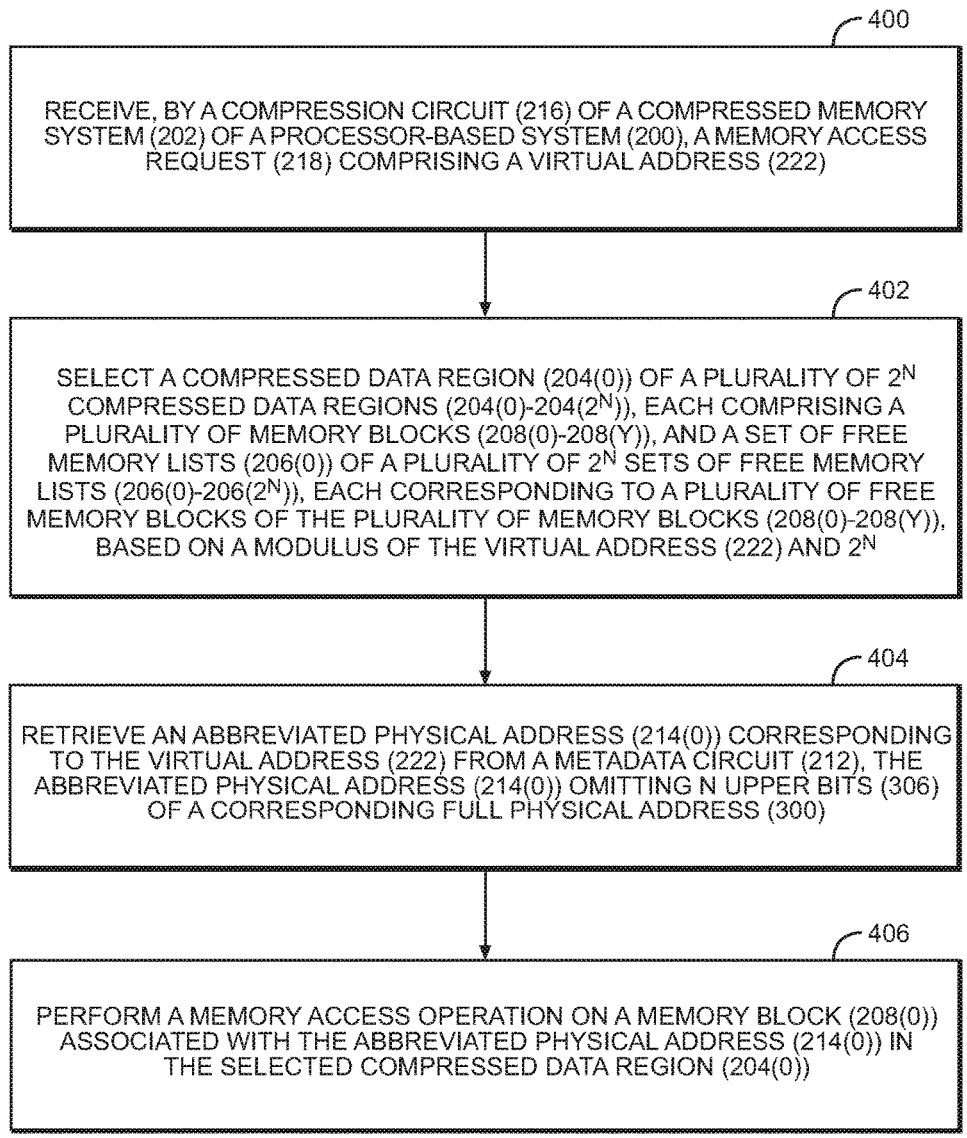
FIG. 4 is a flowchart illustrating exemplary operations of the compressed memory system of FIG. 2 for reducing metadata size using the plurality of $2^N$ compressed data regions and the plurality of $2^N$ sets of free memory lists.

FIG. 4 is a flowchart illustrating exemplary operations of the compressed memory system 202 of FIG. 2 for reducing metadata size using the plurality of compressed data regions 204(0)-204($2^N$) and the plurality of sets of free memory lists 206(0)-206($2^N$). For the sake of clarity, elements of FIGS. 1-3 are referenced in describing FIG. 4. In FIG. 4, operations begin with a compression circuit 216 of a compressed memory system 202 of a processor-based system 200 receiving a memory access request 218 comprising a virtual address 222 (block 400). In this regard, the compression circuit 216 may be referred to herein as "a means for receiving a memory access request comprising a virtual address." The compression circuit 216 next selects a compressed data region, such as compressed data region 204(0), of a plurality of $2^N$ compressed data regions 204(0)-204($2^N$), each comprising a plurality of memory blocks 208(0)-208(Y), and a set of free memory lists, such as the set of free memory lists 206(0), of a plurality of $2^N$ sets of free memory lists 206(0)-206($2^N$), each corresponding to a plurality of free memory blocks of the plurality of memory blocks 208(0)-208(Y), based on a modulus of the virtual address 222 and $2^N$ (block 402). Accordingly, the compression circuit 216 may be referred to herein as "a means for selecting a compressed data region of a plurality of $2^N$ compressed data regions of a system memory, each comprising a plurality of memory blocks, and a set of free memory lists of a plurality of $2^N$ sets of free memory lists, each corresponding to a plurality of free memory blocks of the plurality of memory blocks, based on a modulus of the virtual address and $2^N$."

The compression circuit 216 then retrieves an abbreviated physical address, such as the abbreviated physical address 214(0), corresponding to the virtual address 222 from a metadata circuit 212, the abbreviated physical address 214(0) omitting N upper bits 306 of a corresponding full physical address 300 (block 404). The compression circuit 216 may thus be referred to herein as "a means for retrieving an abbreviated physical address corresponding to the virtual address from a metadata circuit, the abbreviated physical address omitting N upper bits of a corresponding full physical address." The compression circuit 216 performs a memory access operation on a memory block, such as the memory block 208(0), associated with the abbreviated physical address 214(0) in the selected compressed data region 204(0) (block 406). In this regard, the compression circuit 216 may be referred to herein as "a means for performing a memory access operation on a memory block associated with the abbreviated physical address in the selected compressed data region."

Figure 5:
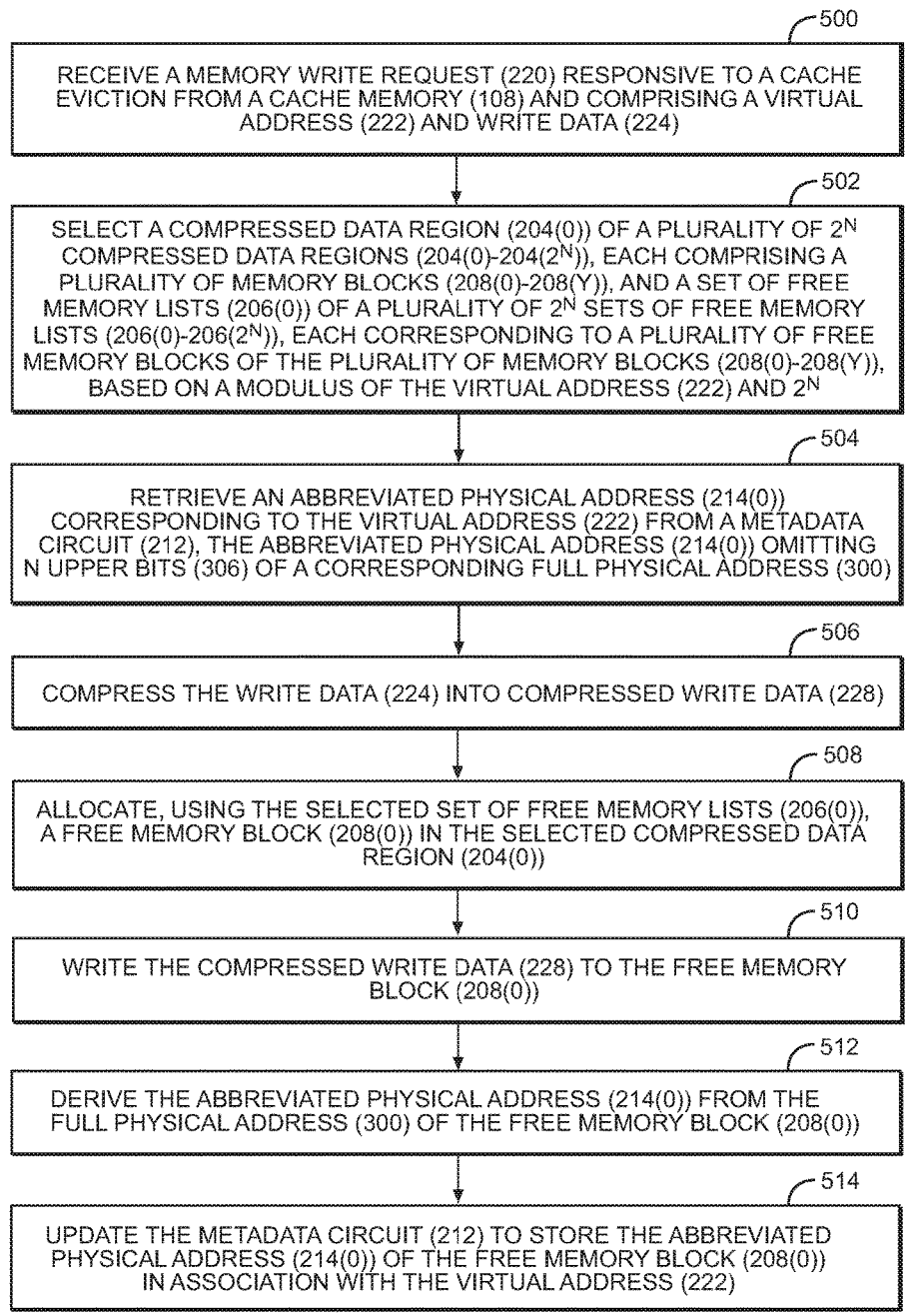
FIG. 5 is a flowchart illustrating exemplary operations of some aspects of the compressed memory system of FIG. 2 for performing a memory write operation.

To illustrate exemplary operations of some aspects of the compressed memory system 202 of FIG. 2 for performing a memory write operation, FIG. 5 is provided. Elements of FIGS. 1-3 are referenced in describing FIG. 5 for the sake of clarity. Operations in FIG. 5 begin with the compression circuit 216 receiving a memory write request 220 responsive to a cache eviction from a cache memory 108 and comprising a virtual address 222 and write data 224 (block 500). In this aspect, the operations of block 500 for receiving the memory write request 220 correspond to the operations of block 400 of FIG. 4 for receiving the memory access request 218. The compression circuit 216 selects a compressed data region, such as the compressed data region 204(0), of a plurality of $2^N$ compressed data regions 204(0)-204($2^N$), each comprising a plurality of memory blocks 208(0)-208(Y), and a set of free memory lists, such as the set of free memory lists 206(0), of a plurality of $2^N$ sets of free memory lists 206(0)-206($2^N$), each corresponding to a plurality of free memory blocks of the plurality of memory blocks 208(0)-208(Y), based on a modulus of the virtual address 222 and $2^N$ (block 502).

The compression circuit 216 next retrieves an abbreviated physical address, such as the abbreviated physical address 214(0), corresponding to the virtual address 222 from a metadata circuit 212, the abbreviated physical address 214(0) omitting N upper bits 306 of a corresponding full physical address 300 (block 504). The compression circuit 216 compresses the write data 224 into compressed write data 228 (block 506). The compression circuit 216 then allocates, using the selected set of free memory lists 206(0), a free memory block, such as the memory block 208(0), in the selected compressed data region 204(0) (block 508). The compression circuit 216 writes the compressed write data 228 to the free memory block 208(0) (block 510). The compression circuit 216 next derives the abbreviated physical address, such as the abbreviated physical address 214(0), from the full physical address 300 of the free memory block 208(0) (block 512). The compression circuit 216 then updates the metadata circuit 212 to store the abbreviated physical address 214(0) of the free memory block 208(0) in association with the virtual address 222 (block 514). It is to be understood that the operations of blocks 506-514 of FIG. 5 correspond in this aspect to operations of block 406 of FIG. 4 for performing the memory access operation.

Figure 6:
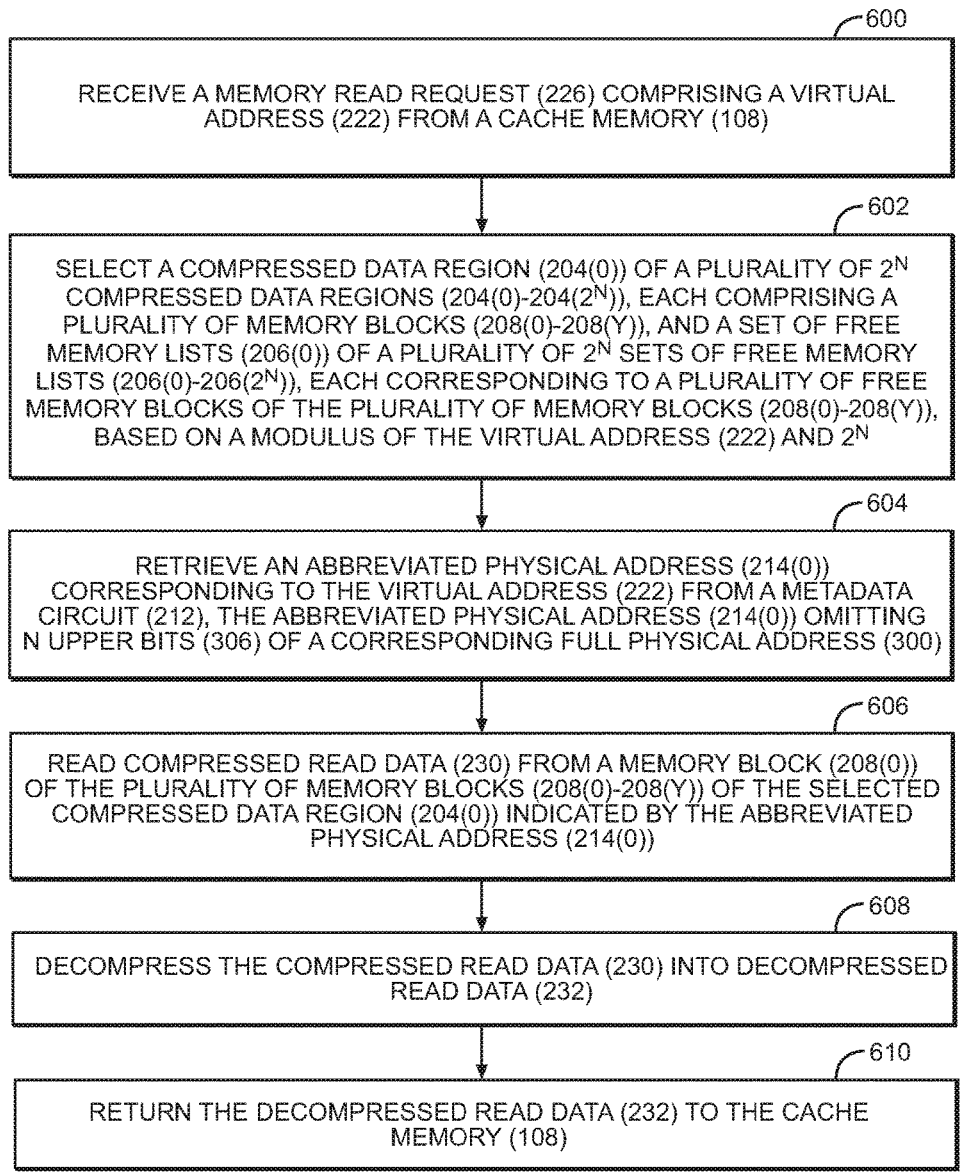
FIG. 6 is a flowchart illustrating exemplary operations of some aspects of the compressed memory system of FIG. 2 for performing a memory read operation.

FIG. 6 is a flowchart illustrating exemplary operations of some aspects of the compressed memory system 202 of FIG. 2 for performing a memory read operation. For the sake of clarity, elements of FIGS. 1-3 are referenced in describing FIG. 6. In FIG. 6, operations begin with the compression circuit 216 receiving a memory read request 226 comprising a virtual address 222 from a cache memory 108 (block 600). In this aspect, the operations of block 600 for receiving the memory read request 226 correspond to the operations of block 400 of FIG. 4 for receiving the memory access request 218.

The compression circuit 216 selects a compressed data region, such as the compressed data region 204(0), of a plurality of $2^N$ compressed data regions 204(0)-204($2^N$), each comprising a plurality of memory blocks 208(0)-208(Y), and a set of free memory lists, such as the set of free memory lists 206(0), of a plurality of $2^N$ sets of free memory lists 206(0)-206($2^N$), each corresponding to a plurality of free memory blocks of the plurality of memory blocks 208(0)-208(Y), based on a modulus of the virtual address 222 and $2^N$ (block 602). The compression circuit 216 next retrieves an abbreviated physical address, such as the abbreviated physical address 214(0), corresponding to the virtual address 222 from a metadata circuit 212, the abbreviated physical address 214(0) omitting N upper bits 306 of a corresponding full physical address 300 (block 604). The compression circuit 216 next reads compressed read data 230 from a memory block, such as the memory block 208(0), of the plurality of memory blocks 208(0)-208(Y) of the selected compressed data region 204(0) indicated by the abbreviated physical address 214(0) (block 606). The compression circuit 216 then decompresses the compressed read data 230 into decompressed read data 232 (block 608). Finally, the compression circuit 216 returns the decompressed read data 232 to the cache memory 108 (block 610). It is to be understood that the operations of blocks 606-610 of FIG. 6 correspond in this aspect to operations of block 406 of FIG. 4 for performing the memory access operation.

Reducing metadata size in compressed memory systems of processor-based systems may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 7:
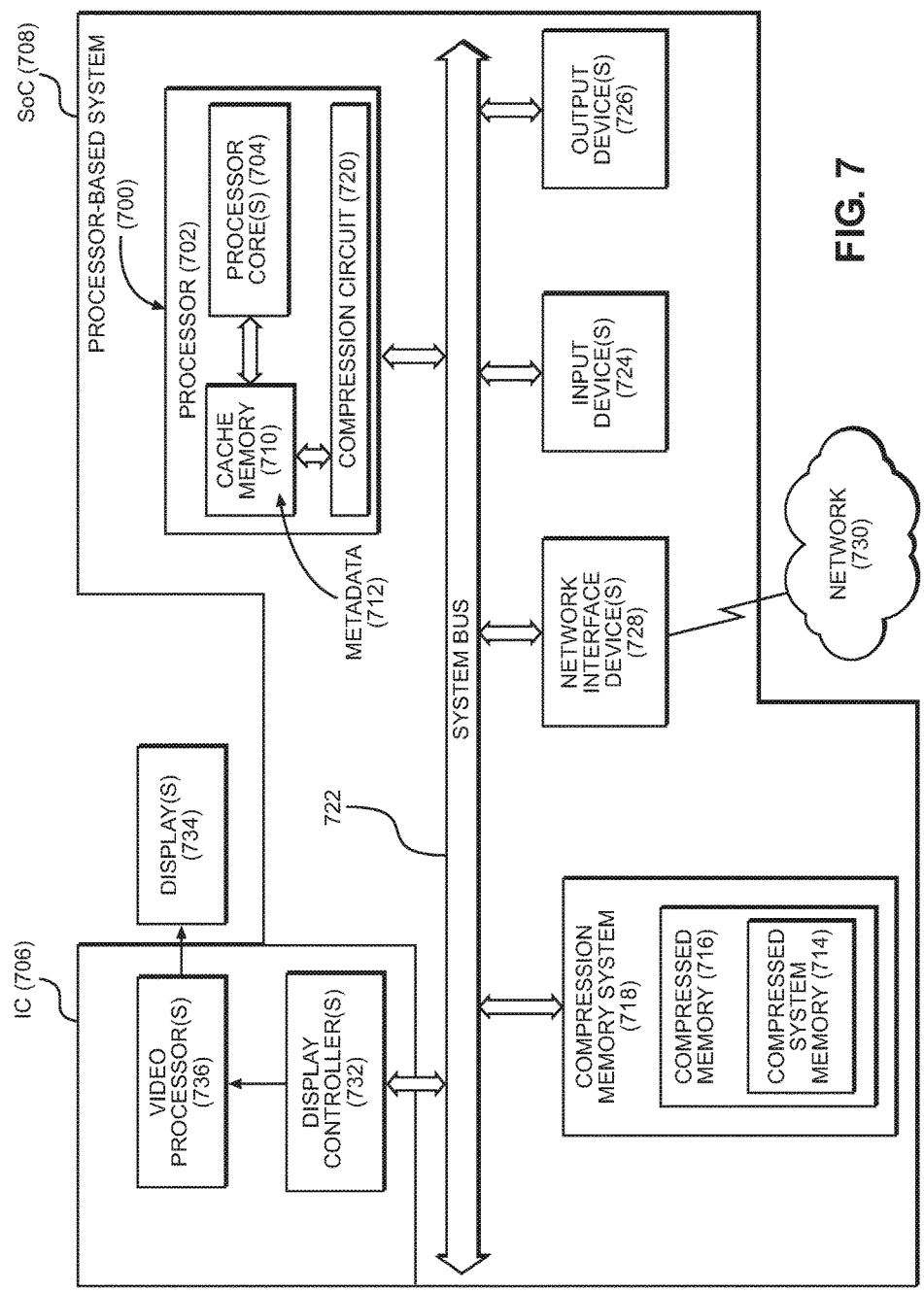
FIG. 7 is a block diagram of an exemplary processor-based system, such as the processor-based system of FIG. 2, that includes a compressed memory system, such as the compressed memory system of FIG. 2, configured to use the plurality of $2^N$ compressed data regions and the plurality of $2^N$ sets of free memory lists to reduce metadata size.

In this regard, FIG. 7 illustrates an example of a processor-based system 700 that includes a processor 702, including one or more processor cores 704. The processor-based system 700 is provided in an integrated circuit (IC) 706. The IC 706 may be included in or provided as a system-on-a-chip (SoC) 708 as an example. The processor 702 includes a cache memory 710 that includes metadata 712 for its uncompressed cache entries for use in mapping evicted cache entries to physical addresses in a compressed system memory 714 as part of a compressed memory 716 in a compression memory system 718. For example, the cache memory 710 may be the cache memory 108 of FIG. 1, and the compressed memory system 202 of FIG. 2 may be the compression memory system 718, as non-limiting examples. A compression circuit 720 is provided for compressing and decompressing data to and from the compression memory system 718. The compression circuit 720 may be provided in the processor 702 or outside of the processor 702 and communicatively coupled to the processor 702 through a shared or private bus. The compression circuit 720 may be the compression circuit 216 of FIG. 2 as a non-limiting example.

The processor 702 is coupled to a system bus 722 to intercouple master and slave devices included in the processor-based system 700. The processor 702 can also communicate with other devices by exchanging address, control, and data information over the system bus 722. Although not illustrated in FIG. 7, multiple system buses 722 could be provided, wherein each system bus 722 constitutes a different fabric. For example, the processor 702 can communicate bus transaction requests to the compression memory system 718 as an example of a slave device. Other master and slave devices can be connected to the system bus 722. As illustrated in FIG. 7, these devices can include one or more input devices 724. The input device(s) 724 can include any type of input device, including, but not limited to, input keys, switches, voice processors, etc. The input device(s) 724 may be included in the IC 706 or external to the IC 706, or a combination of both. Other devices that can be connected to the system bus 722 can also include one or more output devices 726 and one or more network interface devices 728. The output device(s) 726 can include any type of output device, including, but not limited to, audio, video, other visual indicators, etc. The output device(s) 726 may be included in the IC 706 or external to the IC 706, or a combination of both. The network interface device(s) 728 can be any devices configured to allow exchange of data to and from a network 730. The network 730 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 728 can be configured to support any type of communications protocol desired.

Other devices that can be connected to the system bus 722 can also include one or more display controllers 732 as examples. The processor 702 may be configured to access the display controller(s) 732 over the system bus 722 to control information sent to one or more displays 734. The display controller(s) 732 can send information to the display(s) 734 to be displayed via one or more video processors 736, which process the information to be displayed into a format suitable for the display(s) 734. The display controller(s) 732 and/or the video processor(s) 736 may be included in the IC 706 or external to the IC 706, or a combination of both.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master devices and slave devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in computer-executable instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of non-transitory computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A compressed memory system of a processor-based system, comprising:
    a metadata circuit comprising a plurality of metadata entries each having a bit size of N bits omitted from a bit size of a full physical address addressable to a system memory, the system memory comprising a plurality of $2^N$ compressed data regions each comprising a plurality of memory blocks each associated with a full physical address, and a set of free memory lists of a plurality of $2^N$ sets of free memory lists, each corresponding to a plurality of free memory blocks of the plurality of memory blocks;
    the metadata circuit configured to associate a plurality of virtual addresses to a plurality of abbreviated physical addresses stored in the plurality of metadata entries, each abbreviated physical address among the plurality of abbreviated physical addresses omitting N upper bits from a corresponding full physical address addressable to the system memory; and
    a compression circuit configured to:
        receive a memory access request comprising a virtual address;
        select a compressed data region of the plurality of $2^N$ compressed data regions in the system memory, and a set of free memory lists of the plurality of $2^N$ sets of free memory lists based on a modulus of the virtual address and $2^N$;
        retrieve an abbreviated physical address corresponding to the virtual address from the metadata circuit; and
        perform a memory access operation on a memory block of the plurality of memory blocks associated with the abbreviated physical address in the selected compressed data region.

2. The compressed memory system of claim 1, further comprising a cache memory;
    wherein the compression circuit is configured to receive the memory access request comprising the virtual address by being configured to receive a memory write request that is responsive to a cache eviction from the cache memory and that comprises the virtual address and write data.

3. The compressed memory system of claim 2, wherein the compression circuit is configured to perform the memory access operation on the memory block associated with the abbreviated physical address in the selected compressed data region by being configured to:
    compress the write data into compressed write data;
    allocate, using the selected set of free memory lists, a free memory block in the selected compressed data region;
    write the compressed write data to the free memory block;
    derive the abbreviated physical address from the full physical address of the free memory block; and
    update the metadata circuit to store the abbreviated physical address of the free memory block in association with the virtual address.

4. The compressed memory system of claim 1, further comprising a cache memory;
    wherein the compression circuit is configured to receive the memory access request comprising the virtual address by being configured to receive a memory read request comprising the virtual address from the cache memory.

5. The compressed memory system of claim 4, wherein the compression circuit is configured to perform the memory access operation on the memory block associated with the abbreviated physical address in the selected compressed data region by being configured to:
    read data from the memory block of the plurality of memory blocks of the selected compressed data region indicated by the abbreviated physical address;
    decompress the data into decompressed read data; and
    return the decompressed read data to the cache memory.

6. The compressed memory system of claim 1, wherein:
    each abbreviated physical address of the plurality of abbreviated physical addresses of the metadata circuit omits four (4) bits of the corresponding full physical address;
    the plurality of $2^N$ compressed data regions comprises 16 compressed data regions;
    the corresponding plurality of $2^N$ sets of free memory lists comprises 16 sets of free memory lists; and
    the compression circuit is configured to select the compressed data region of the plurality of $2^N$ compressed data regions and the set of free memory lists of the plurality of $2^N$ sets of free memory lists based on the modulus of the virtual address and the value 16.

7. The compressed memory system of claim 1 integrated into a processor-based system.

8. The compressed memory system of claim 1 integrated into a system-on-a-chip (SoC) comprising a processor.

9. The compressed memory system of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

10. A compressed memory system of a processor-based system for reducing metadata size in compressed memory systems of processor-based systems, comprising:
a means for associating a plurality of virtual addresses to a plurality of abbreviated physical addresses each corresponding to a memory block in a system memory, the system memory comprising a plurality of $2^N$ compressed data regions each comprising: a plurality of memory blocks each associated with a full physical address, and a set of free memory lists of a plurality of $2^N$ sets of free memory lists each corresponding to a plurality of free memory blocks of the plurality of memory blocks;
the plurality of abbreviated physical addresses each omitting N upper bits of a corresponding full physical address addressable to the system memory;
a means for receiving a memory access request comprising a virtual address;
a means for selecting a compressed data region of the plurality of $2^N$ compressed data regions of the system memory and a set of free memory lists of the plurality of $2^N$ sets of free memory lists, based on a modulus of the virtual address and $2^N$;
a means for retrieving an abbreviated physical address corresponding to the virtual address from the means for associating a plurality of virtual addresses to a plurality of abbreviated physical addresses; and
a means for performing a memory access operation on a memory block associated with the abbreviated physical address in the selected compressed data region.

11. A method for reducing metadata size in compressed memory systems of processor-based systems, comprising:
storing an abbreviated physical address in a metadata entry among a plurality of metadata entries in a metadata circuit, each metadata entry among the plurality of metadata entries having bit size of N bits omitted from a bit size of a full physical address addressable to a system memory, the system memory comprising: a plurality of $2^N$ compressed data regions each comprising a plurality of memory blocks each associated with a full physical address, and a set of free memory lists of a plurality of $2^N$ sets of free memory lists each corresponding to a plurality of free memory blocks of the plurality of memory blocks;
receiving, by a compression circuit of a compressed memory system of a processor-based system, a memory access request comprising a virtual address;
selecting a compressed data region of the plurality of $2^N$ compressed data regions in the system memory and a set of free memory lists of the plurality of $2^N$ sets of free memory lists, based on a modulus of the virtual address and $2^N$;
retrieving an abbreviated physical address corresponding to the virtual address from the metadata circuit; and
performing a memory access operation on a memory block associated with the abbreviated physical address in the selected compressed data region.

12. The method of claim 11, wherein receiving the memory access request comprising the virtual address comprises receiving a memory write request responsive to a cache eviction from a cache memory and comprising the virtual address and write data.

13. The method of claim 12, wherein performing the memory access operation on the memory block associated with the abbreviated physical address in the selected compressed data region comprises:
compressing the write data into compressed write data;
allocating, using the selected set of free memory lists, a free memory block in the selected compressed data region;
writing the compressed write data to the free memory block;
deriving the abbreviated physical address from the full physical address of the free memory block; and
updating the metadata circuit to store the abbreviated physical address of the free memory block in association with the virtual address.

14. The method of claim 11, wherein receiving the memory access request comprising the virtual address comprises receiving a memory read request comprising the virtual address from a cache memory.

15. The method of claim 14, wherein performing the memory access operation on the memory block associated with the abbreviated physical address in the selected compressed data region comprises:
reading data from the memory block of the plurality of memory blocks of the selected compressed data region indicated by the abbreviated physical address;
decompressing the data into decompressed read data; and
returning the decompressed read data to the cache memory.

16. The method of claim 11, wherein:
each abbreviated physical address of a plurality of abbreviated physical addresses of the metadata circuit omits four (4) bits of the corresponding full physical address;
the plurality of $2^N$ compressed data regions comprises 16 compressed data regions;
the corresponding plurality of $2^N$ sets of free memory lists comprises 16 sets of free memory lists; and
selecting the compressed data region of the plurality of $2^N$ compressed data regions and the set of free memory lists of the plurality of $2^N$ sets of free memory lists is based on a modulus of the virtual address and the value 16.

17. A non-transitory computer-readable medium having stored thereon computer-executable instructions which, when executed by a processor, cause the processor to:
store an abbreviated physical address in a metadata entry among a plurality of metadata entries in a metadata circuit, each metadata entry among the plurality of metadata entries having a bit size of N bits omitted from a bit size of a full physical address addressable to a system memory, the system memory comprising: a plurality of $2^N$ compressed data regions each comprising a plurality of memory blocks each associated with a full physical address, and a set of free memory lists of a plurality of $2^N$ sets of free memory lists each corresponding to a plurality of free memory blocks of the plurality of memory blocks;
receive a memory access request comprising a virtual address;
select a compressed data region of the plurality of $2^N$ compressed data regions in the system memory and a set of free memory lists of the plurality of $2^N$ sets of free memory lists, based on a modulus of the virtual address and $2^N$;
retrieve an abbreviated physical address corresponding to the virtual address from the metadata circuit; and perform a memory access operation on a memory block associated with the abbreviated physical address in the selected compressed data region.

18. The non-transitory computer-readable medium of claim 17 having stored thereon computer-executable instructions which, when executed by a processor, further cause the processor to receive the memory access request comprising the virtual address by causing the processor to receive a memory write request responsive to a cache eviction from a cache memory and comprising the virtual address and write data.

19. The non-transitory computer-readable medium of claim 18 having stored thereon computer-executable instructions which, when executed by a processor, further cause the processor to perform the memory access operation on the memory block associated with the abbreviated physical address in the selected compressed data region by causing the processor to:
compress the write data into compressed write data;
allocate, using the selected set of free memory lists, a free memory block in the selected compressed data region;
write the compressed write data to the free memory block;
derive the abbreviated physical address from the full physical address of the free memory block; and
update the metadata circuit to store the abbreviated physical address of the free memory block in association with the virtual address.

20. The non-transitory computer-readable medium of claim 17 having stored thereon computer-executable instructions which, when executed by a processor, further cause the processor to receive the memory access request comprising the virtual address by causing the processor to receive a memory read request comprising the virtual address from a cache memory.

21. The non-transitory computer-readable medium of claim 20 having stored thereon computer-executable instructions which, when executed by a processor, further cause the processor to perform the memory access operation on the memory block associated with the abbreviated physical address in the selected compressed data region by causing the processor to:
read data from the memory block of the plurality of memory blocks of the selected compressed data region indicated by the abbreviated physical address;
decompress the data into decompressed read data; and
return the decompressed read data to the cache memory.

* * * * *